United States Patent
Maeda et al.

(10) Patent No.: US 9,205,873 B2
(45) Date of Patent: Dec. 8, 2015

(54) VEHICLE BODY STRUCTURE

(75) Inventors: Sho Maeda, Toyota (JP); Yoshitaka Sotoyama, Nisshin (JP); Koki Ikeda, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/381,695

(22) PCT Filed: Mar. 1, 2012

(86) PCT No.: PCT/JP2012/055275
§ 371 (c)(1),
(2), (4) Date: Aug. 28, 2014

(87) PCT Pub. No.: WO2013/128619
PCT Pub. Date: Sep. 6, 2013

(65) Prior Publication Data
US 2015/0048652 A1 Feb. 19, 2015

(51) Int. Cl.
*B62D 25/20* (2006.01)
*B62D 21/15* (2006.01)
*B62D 23/00* (2006.01)
*B62D 29/04* (2006.01)

(52) U.S. Cl.
CPC ............ *B62D 25/2009* (2013.01); *B62D 21/15* (2013.01); *B62D 23/00* (2013.01); *B62D 25/2018* (2013.01); *B62D 29/041* (2013.01)

(58) Field of Classification Search
CPC ...... B62D 25/009; B62D 21/15; B62D 23/00; B62D 25/2018; B62D 29/041
USPC .............. 296/193.04, 193.07, 187.08, 901.01
See application file for complete search history.

(56) References Cited

U.S. PATENT DOCUMENTS 6,209,948 B1 4/2001 Mori et al.
2014/0319874 A1 10/2014 Matsuda

FOREIGN PATENT DOCUMENTS

| EP | 2786918 A1 | 10/2014 |
| JP | 61-190776 U | 11/1986 |
| JP | 01-132474 A | 5/1989 |
| JP | 02-051185 U | 4/1990 |
| JP | 03-060166 U | 6/1991 |

(Continued)

*Primary Examiner* — Joseph D Pape
(74) *Attorney, Agent, or Firm* — Kenyon & Kenyon LLP

(57) ABSTRACT

This provides a vehicle body structure including: a lower panel made of resin, which has a lower wall that forms a lower portion of a floor portion, an outer front wall that is placed to extend from a vehicle body front end of the lower wall to an upper direction of a vehicle body, and an outer back wall that is placed to extend from a vehicle body backside end of the lower wall to the upper direction of the vehicle body; and an upper panel made of resin, which has upper walls that form an upper portion of the floor portion opposite to the lower wall, an inner front wall that is placed to extend from the vehicle body front ends of the upper walls to the upper direction of the vehicle body and joined to the outer front wall and consequently forms a closed cross-section shape that extends in a vehicle width direction while including both of left and right ends at an upper portion of the outer front wall, and an inner back wall that is placed to extend from the vehicle body backside ends of the upper walls to the upper direction of the vehicle body and joined to the outer back wall and consequently forms a closed cross-section shape that extends in the vehicle width direction while including both of left and right ends at an upper portion of the outer back wall.

6 Claims, 12 Drawing Sheets

(56) References Cited

FOREIGN PATENT DOCUMENTS

| | | |
|---|---|---|
| JP | 03-084286 U | 8/1991 |
| JP | 06-064559 A | 3/1994 |
| JP | 08-002438 A | 1/1996 |
| JP | 3200853 B2 | 6/2001 |
| JP | 2003-285766 A | 10/2003 |
| JP | 2004-501892 | 3/2004 |
| JP | 2004-501892 N1 | 3/2004 |
| JP | 2008-049894 A | 3/2008 |
| JP | 2008-155700 A | 7/2008 |
| JP | 2012-140083 A | 7/2012 |

F I G . 6
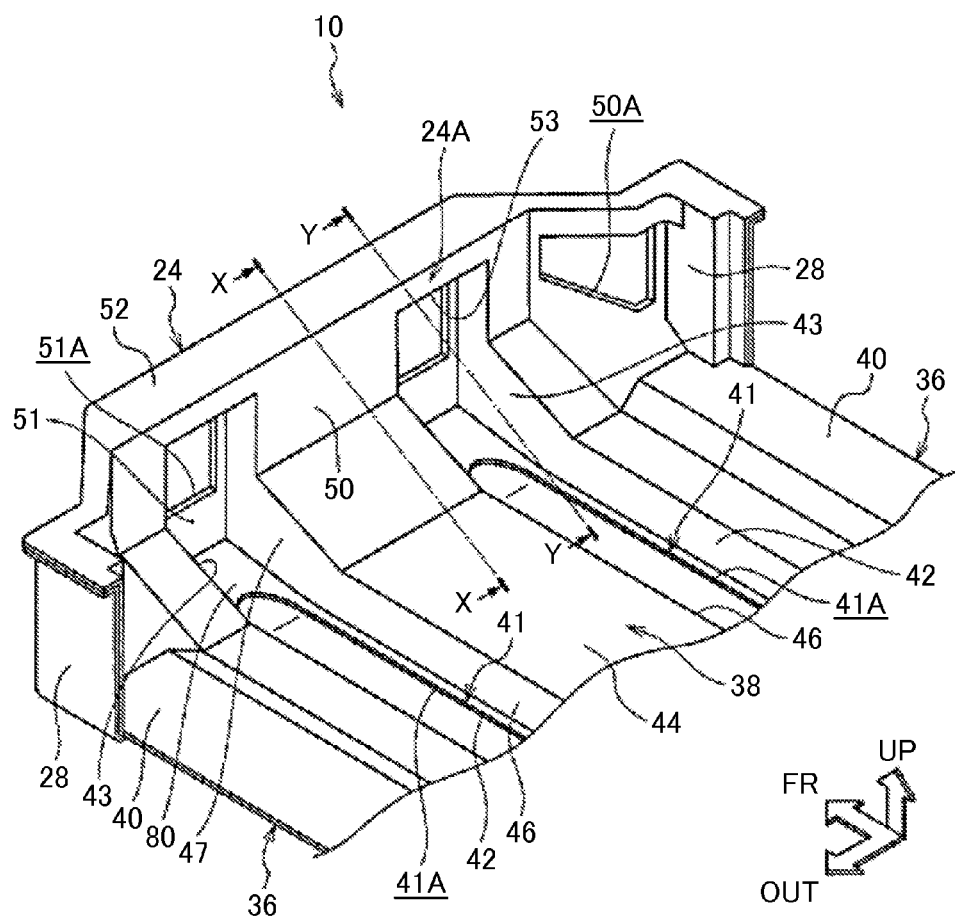

US 9,205,873 B2

VEHICLE BODY STRUCTURE

CROSS-REFERENCE TO RELATED APPLICATIONS

This is a national phase application based on the PCT International Patent Application No. PCT/JP2012/055275 filed Mar. 1, 2012, the entire contents of which are incorporated herein by reference.

TECHNICAL FIELD

The present invention relates to a vehicle body structure that contains a floor portion made of resin.

BACKGROUND ART

A vehicle body floor portion structure in which a locker, a floor panel, a dash panel, a cross member, a front cross member and a rear cross member are made of carbon fiber reinforced plastic is conventionally known (for example, refer to Japanese Patent Application Publication No. 2008-155700 (JP 2008-155700 A), Japanese Patent Application Publication No. 1-132474 (JP 1-132474 A) and Japanese Patent Application Publication No. 6-64559 (JP 6-64559 A). Also, a floor portion structure that improves a load transmission efficiency at a time of a collision although the floor portion structure is not made of the resin is conventionally known (for example, refer to Japanese Patent Application Publication No. 2003-285766 (JP 2003-285766 A), Japanese Patent Application Publication No. 2008-49894 (JP 2008-49894 A) and Japanese Utility Model Application Publication No. 3-84286 (JP 3-84286 U).

DISCLOSURE OF THE INVENTION

Problem to be Solved by the Invention

However, even in the vehicle body floor portion structure made of the resin, it is desired to efficiently transmit a load inputted from a front-back direction of a vehicle body at a time of a front surface collision or rear surface collision, and for the advancement of its load transmission efficiency, there is still room for improvement.

So, in view of the above circumstances, an object of the present invention is to obtain the vehicle body structure that can efficiently transmit the load inputted from the front-back direction of the vehicle body.

Means to Solve the Problem

In order to achieve the above-mentioned object, a vehicle body structure of a first aspect according to the present invention includes: a lower panel made of resin, which has a lower wall that configures a lower portion of a floor portion, an outer front wall that is placed to extend from a vehicle body front end of the lower wall to an upper direction of a vehicle body, and an outer back wall that is placed to extend from a vehicle body backside end of the lower wall to the upper direction of the vehicle body; and an upper panel made of resin, which has an upper wall that configures an upper portion of the floor portion oppositely to the lower wall and also configures a closed cross-section shape extending in a front-back direction of the vehicle body, an inner front wall that is placed to extend from the vehicle body front end of the upper wall to the upper direction of the vehicle body and joined to the outer front wall and consequently configures a closed cross-section shape that is connected to the closed cross-section shape extending in the front-back direction of the vehicle body and extends in the vehicle width direction while including both of left and right ends at the upper portion of the outer front wall, and an inner back wall that is placed to extend from the vehicle body backside end portion of the upper wall to the upper direction of the vehicle body and joined to the outer back wall and consequently configures a closed cross-section shape that is connected to the closed cross-section shape extending in the front-back direction of the vehicle body and extends in the vehicle width direction while including both of the left and right ends at an upper portion of the outer back wall.

According to the first aspect of the present invention, since the outer front wall of the lower panel and the inner front wall of the upper panel are joined, thereby configuring the closed cross-section shape that extends in the vehicle width direction while including both of the left and right ends at its upper portion, and the outer back wall of the lower panel and the inner back wall of the upper panel are joined, thereby configuring the closed cross-section shape that extends in the vehicle width direction while including both of the left and right ends at its upper portion. Thus, a load, which is inputted from the vehicle body front to the outer front wall, is transmitted to the outside in the vehicle width direction through its closed cross-section shape, and a load, which is inputted from the vehicle body backside to the outer back wall, is transmitted to the outside in the vehicle width direction through its closed cross-section shape.

Here, both of the left and right ends of the upper portion of the vehicle body front which are formed as the closed cross-section shape are joined to a front pillar as a vehicle body framework member, respectively, and both of the left and right ends of the upper portion of the vehicle body backside which are formed as the closed cross-section shape are joined to a rear pillar as the vehicle body framework member, respectively. Thus, the loads, which are transmitted to the outsides in the vehicle width direction (both of the left and right ends of the respective upper portions) through the closed cross-section shapes, are transmitted to the front pillar or the rear pillar and absorbed thereby. In this way, according to the present invention, the load inputted from the front-back direction of the vehicle body can be efficiently transmitted to the front pillar or the rear pillar.

Also, a vehicle body structure of a second aspect according to the present invention includes: a lower panel made of resin, which has a lower wall that configures a lower portion of a floor portion, an outer front wall that is placed to extend from a vehicle body front end of the lower wall to an upper direction of a vehicle body, and an outer back wall that is placed to extend from a vehicle body backside end of the lower wall to the upper direction of the vehicle body; an upper panel made of resin, which has an upper wall that configures an upper portion of the floor portion oppositely to the lower wall and consequently configures a closed cross-section shape extending in a front-back direction of the vehicle body; a front panel made of resin, which has an inner front wall, wherein since it is joined to the vehicle body front end of the upper wall and the outer front wall, a closed cross-section shape that is connected to the closed cross-section shape extending in the front-back direction of the vehicle body and extends in a vehicle width direction while including both of left and right ends is configured at an upper portion of the outer front wall; and a rear panel made of resin, which has an inner back wall, wherein since it is joined to the vehicle body backside end of the upper wall and the outer back wall, a closed cross-section shape that is connected to the closed cross-section shape extending in the front-back direction of the vehicle body and extends in the vehicle width direction while including both of left and right ends is formed at an upper portion of the outer back wall.

According to the second aspect of the present invention, since the outer front wall of the lower panel and the inner front wall of the front panel are joined, thereby configuring the closed cross-section shape that extends in the vehicle width direction while including both of the left and right ends at its upper portion, and the outer back wall of the lower panel and the inner back wall of the rear panel are joined, thereby configuring the closed cross-section shape that extends in the vehicle width direction while including both of the left and right ends at its upper portion. Thus, a load, which is inputted from the vehicle body front to the outer front wall, is transmitted to the outside in the vehicle width direction through its closed cross-section shape, and a load, which is inputted from the vehicle body backside to the outer back wall, is transmitted to the outside in the vehicle width direction through its closed cross-section shape.

Here, both of the left and right ends of the upper portion of the vehicle body front which are formed as the closed cross-section shape are joined to a front pillar as a vehicle body framework member, respectively, and both of the left and right ends of the upper portion of the vehicle body backside which are formed as the closed cross-section shape are joined to a rear pillar as the vehicle body framework member, respectively. Thus, the loads, which are transmitted to the outsides in the vehicle width direction (both of the left and right ends of the respective upper portions) through the closed cross-section shapes, are transmitted to the front pillar or the rear pillar and absorbed thereby. In this way, according to the present invention, the load inputted from the front-back direction of the vehicle body can be efficiently transmitted to the front pillar or the rear pillar.

Also, a vehicle body structure of a third aspect according to the present invention is the vehicle body structure of the first or second aspect, wherein the closed cross-section shape that is formed by at least the outer front wall and the inner front wall is formed at a position at which the closed cross-section shape overlaps with a door belt line in an upper-lower direction of the vehicle body, when they are viewed from the vehicle width direction.

According to the third aspect according to the present invention, the closed cross-section shape, which is formed by at least the outer front wall and the inner front wall when they are viewed from the vehicle width direction, overlaps with the door belt line in the upper-lower direction of the vehicle body. Thus, the load that is transmitted to the outside of the vehicle width direction (both of the left and right ends of the upper portion) through its closed cross-section shape is transmitted even to the door belt line and absorbed thereby. In this way, according to the present invention, the load that is inputted from at least the front direction of the vehicle body can be efficiently transmitted to the door belt line.

Also, a vehicle body structure of a fourth aspect according to the present invention is the vehicle body structure described in any one of the first to third aspects, wherein the closed cross-section shape that is formed by at least the outer front wall and the inner front wall is formed continuously between both of the left and right ends.

According to the fourth aspect according to the present invention, the closed cross-section shape, which is formed by at least the outer front wall and the inner front wall, is formed continuously between both of the left and right ends. Thus, the load that is inputted from at least the front side of the vehicle body can be efficiently transmitted to the outside of the vehicle width direction (both of the left and right ends of the upper portion), through its closed cross-section shape.

Effect of the Invention

As mentioned above, according to the present invention, it is possible to efficiently transmit the load inputted from the front-back direction of the vehicle body.

BRIEF DESCRIPTION OF THE DRAWINGS

FIG. 6 is a perspective view, which shows a vehicle body front side of the floor portion of the resin body structure according to the first embodiment, by enlarging the vehicle body front.

MODES FOR CARRYING OUT THE INVENTION

Figure 1:
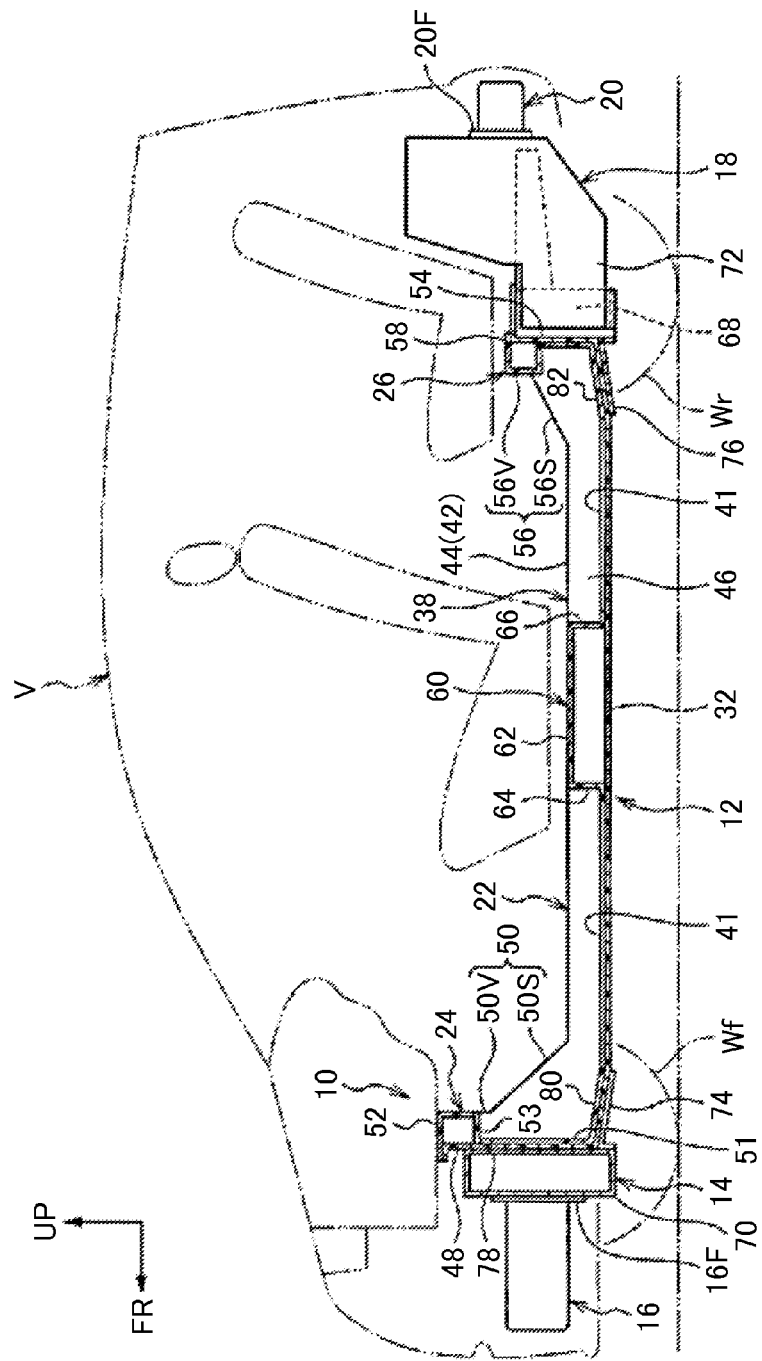
FIG. 1 is a side cross-sectional view showing a schematic configuration of an automobile that contains a resin body structure according to a first embodiment.

The embodiment according to the present invention will be described below in detail on the basis of the drawings. By the way, an arrow mark FR that is arbitrarily shown in the drawing shows a front direction in a vehicle body front-back direction, and an arrow mark UP shows an upper direction in a vehicle body upper-lower direction, and an arrow mark OUT shows an outside in a vehicle width direction, respectively. Also, in the following explanations, when the front-back, upper-lower and left-right directions are used without any special mention, they are defined to indicate the front-back direction in the vehicle body front-back direction, the upper-lower direction in the vehicle body upper-lower direction, and the left-right direction in the vehicle body left-right direction (the vehicle width direction), respectively.

As shown in FIG. 1, a resin body structure 10 as a vehicle body structure according to this embodiment is applied to an (electric) automobile V as a vehicle. This resin body structure 10 is formed so that an under body 12, a front suspension module 14, a front energy absorption member (hereafter, referred to as "a front EA member") 16, a rear suspension module 18 and a rear energy absorption member (hereafter, referred to as "a rear EA member") 20 serve as main portions.

(Configuration of Under Body According to First Embodiment)

Figure 2:
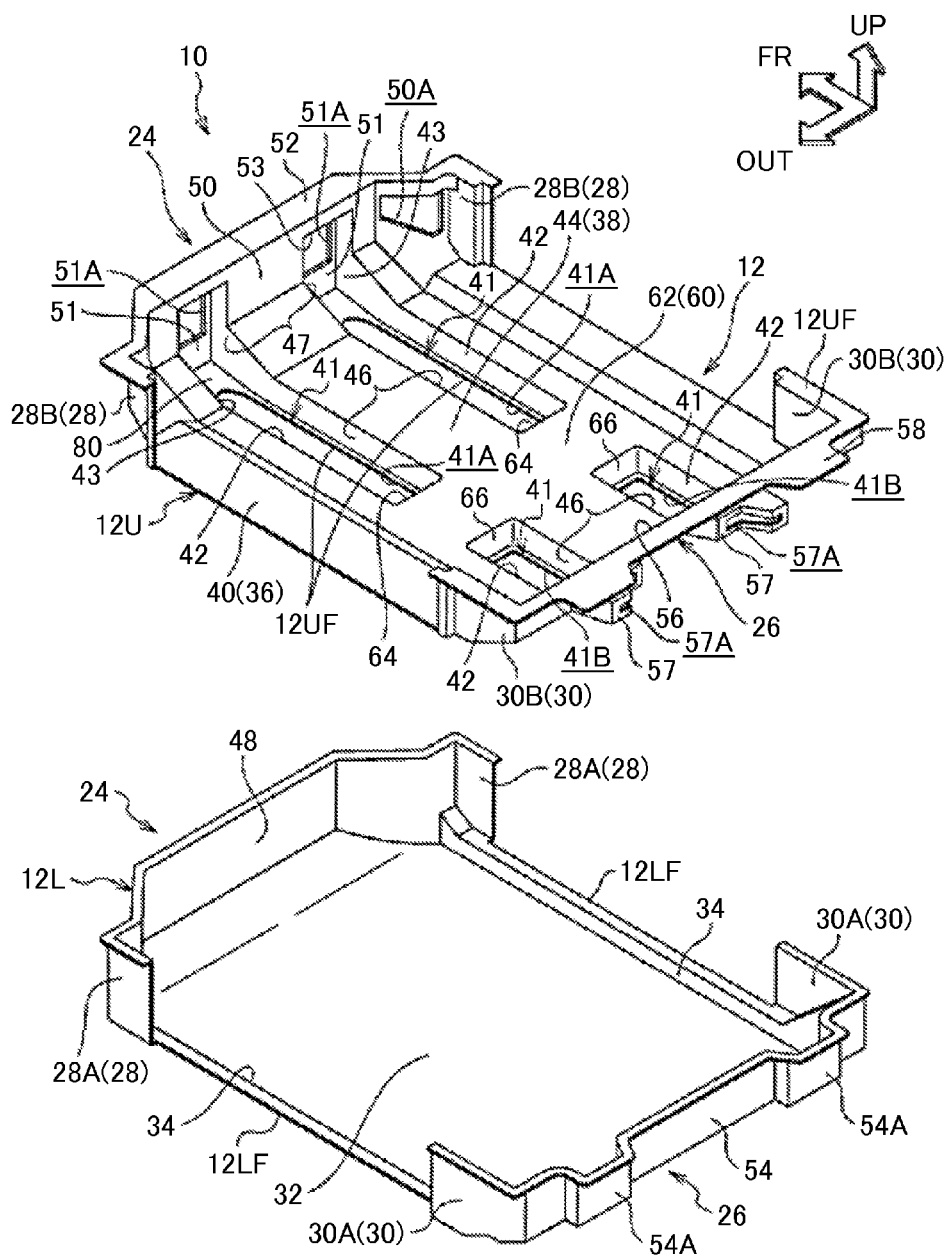
FIG. 2 is an exploded perspective view showing an upper panel and a lower panel, which form a floor portion of the resin body structure according to the first embodiment, when they are viewed from behind a vehicle body.
Figure 3:
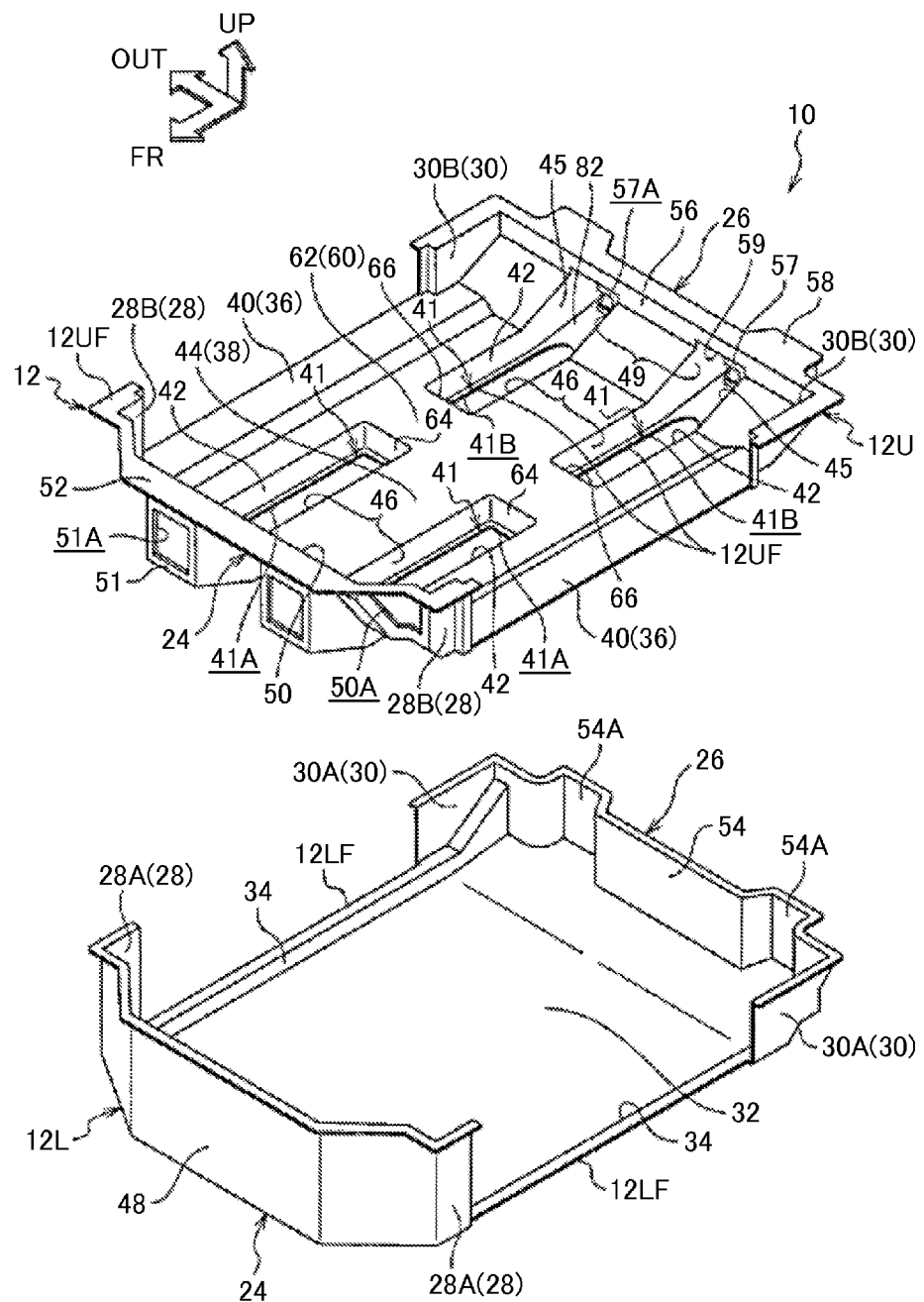
FIG. 3 is an exploded perspective view showing the upper panel and the lower panel, which form the floor portion of the resin body structure according to the first embodiment, when they are viewed from before the vehicle body.

At first, the first embodiment is explained. As shown in FIG. 2 and FIG. 3, the under body 12 made of resin according to the first embodiment is formed by a lower panel 12L and an upper panel 12U. Since the lower panel 12L and the upper panel 12U are joined, a floor portion 22 (refer to FIG. 1) whose shape is approximately rectangular in a plain view is formed.

Also, this under body 12 is formed to include: a dash lower portion 24 as a front wall portion, which is placed upwardly from a front end of the floor portion 22; and a lower back portion 26 as a back wall portion, which is placed upwardly from a back end of the floor portion 22. Each of the dash lower portion 24 and the lower back portion 26 has a length equal to an approximately entire width of the floor portion 22, and in a front view, its vehicle width direction is formed as an approximately rectangular shape in a longitudinal direction.

Figure 4:
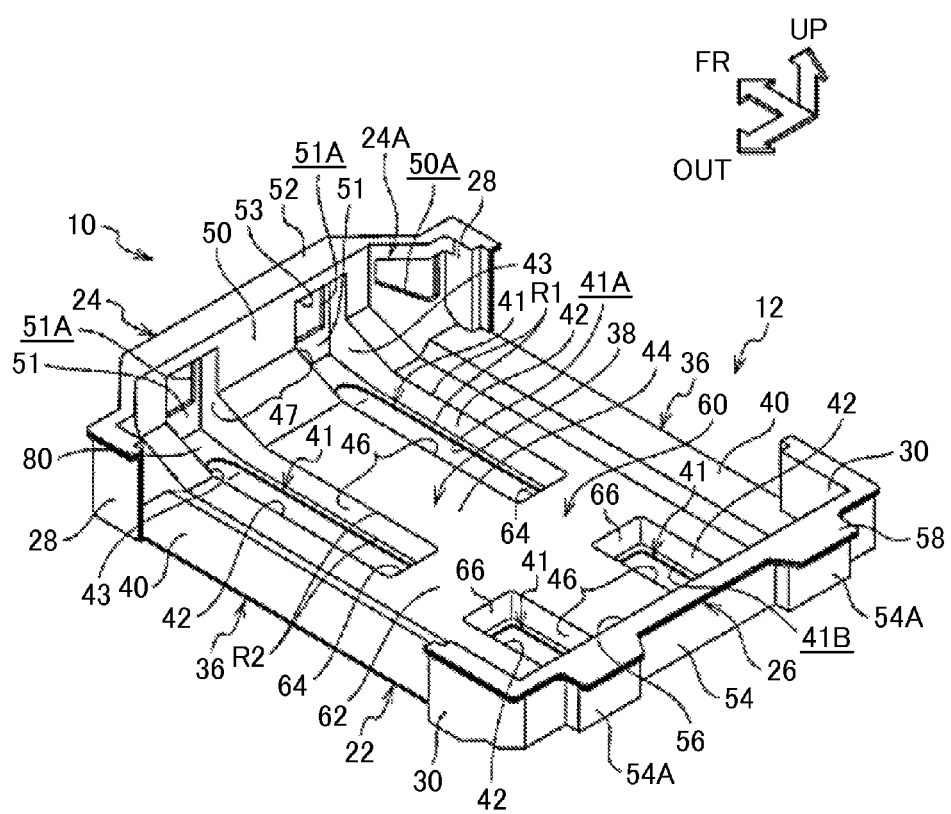
FIG. 4 is a perspective view showing the floor portion of the resin body structure according to the first embodiment when it is viewed from behind the vehicle body.
Figure 5:
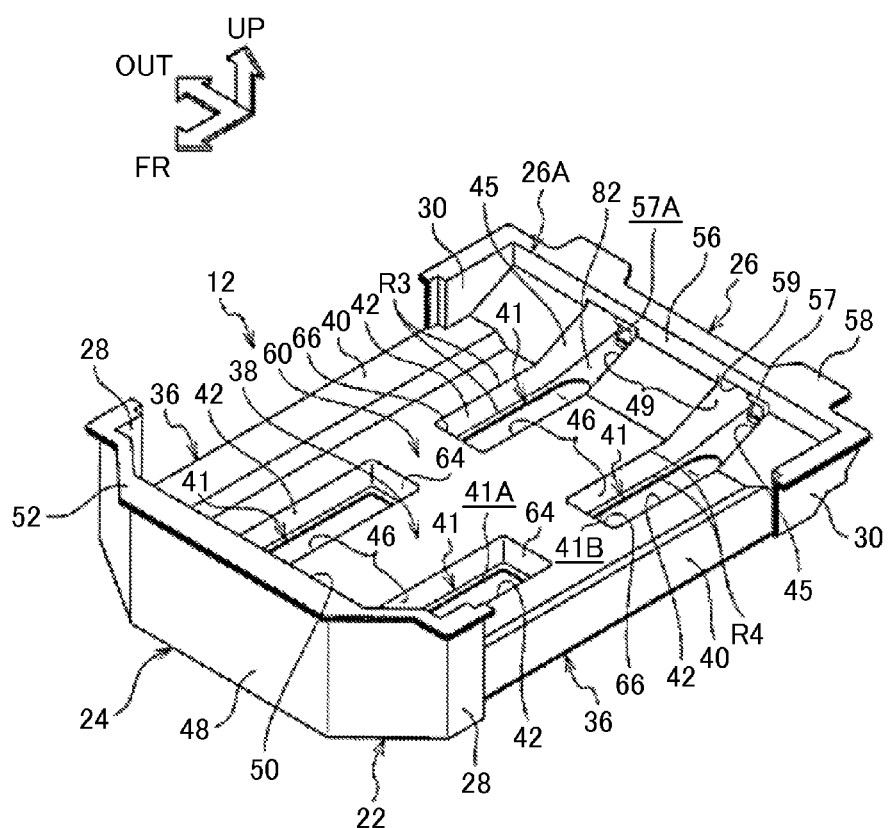
FIG. 5 is a perspective view showing the floor portion of the resin body structure according to the first embodiment when it is viewed from before the vehicle body.

Also, as shown in FIG. 4 and FIG. 5, from both ends in the vehicle width direction of the dash lower portion 24, front walls 28 are backwardly extended, and from both ends in the vehicle width direction of the lower back portion 26, back walls 30 are forwardly extended. In the front walls 28 and the back walls 30, respective lower ends are connected to outer ends in the vehicle width direction of the floor portion 22 (a locker portion 36 that will be explained later) and separated from each other in the front-back direction. As mentioned above, the under body 12 is entirely formed as a bath tab shape (the bath tab shape in which a part of a side wall is cut).

Also, as shown in FIG. 1 to FIG. 5, the floor portion 22 has a lower wall 32 that is flat along a substantially horizontal surface and upper walls 40 and 44 that are opposite to this lower wall 32 in the upper-lower direction and flat along the substantially horizontal surface. And, a pair of left and right locker portions 36 as side framework structure portions in which the respective front-back directions are defined as longitudinal directions, and a tunnel portion 38 as a center framework structure portion are formed in this floor portion 22.

Each of the pair of left and right locker portions 36 is formed by the lower wall 32, the upper wall 40 as a locker wall which is opposite to the lower wall 32 in the upper-lower direction, an outer wall 34 which is upwardly placed from both sides in the vehicle width direction of the lower wall 32, and an inner wall 42 as a longitudinal wall opposite to the outer wall 34 in the vehicle width direction (which faces the vehicle width direction), as a closed cross-section structure of rectangular frame shape, in a front cross-sectional view viewed from the front-back direction of the vehicle body.

The tunnel portion 38 is formed by the lower wall 32, the upper wall 44 as a tunnel wall that is opposite to the lower wall 32 in the upper-lower direction, and center side walls 46 as a pair of longitudinal walls opposite to each other (which faces the vehicle width direction), as a closed cross-section structure of rectangular frame shape, in a front cross-sectional view viewed from the front-back direction of the vehicle body.

By the way, in this embodiment, the upper wall 40 on both sides in the vehicle width direction and the upper wall 44 at a center in the vehicle width direction are formed so that their opposite intervals from the lower wall 32 differ from each other. That is, the left and right locker portions 36 are formed to be higher than the tunnel portion 38. Also, since the left and right locker portions 36 and the tunnel portion 38 are formed in the floor portion 22, a lower groove portion 41 which is concave in a front cross-sectional view viewed from the front-back direction of the vehicle body is formed between the upper wall 40 and the upper wall 44.

A rectangular opening 41A where a vehicle body backside end substantially arrives at a front wall 64 (that will be described later) and a vehicle body front end is tapered is formed in the lower groove portion 41 on a front side of a center cross portion 60 that will be described later. And, a rectangular opening 41B where the vehicle body front end substantially arrives at a back wall 66 (that will be described later) and the vehicle body backside end is tapered is formed in the lower groove portion 41 on a back side of its center cross portion 60.

Moreover, the lower groove portion 41 located on the vehicle body front from the opening 41A (the vehicle body front portion except the opening 41A in the lower groove portion 41 of the front side) serves as a joint portion 80 joined to the lower wall 32. Then, parts of the lower groove portion 41 around the opening 41A except the joint portion 80 serve as upper flanges 12UF joined to the lower wall 32.

On the other hand, the lower groove portion 41 located on the vehicle body backside from the opening 41B (the vehicle body backside portion except the opening 41B in the lower groove portion 41 of the back side) serves as a joint portion 82 joined to the lower wall 32. Then, parts of the lower groove portion 41 around the opening 41B except the joint portion 82 serve as the upper flanges 12UF joined to the lower wall 32.

Also, the dash lower portion 24 is formed as the three closed cross-section structures that are integrally continuous and located upwardly from the respective front ends of the left and right locker portions 36 and the tunnel portion 38, as shown in FIG. 4. And, the lower back portion 26 is formed as the three closed cross-section structures that are integrally continuous and located upwardly from the respective back ends of the left and right locker portions 36 and the tunnel portion 38, as shown in FIG. 5.

In detail, as shown in FIG. 2 and FIG. 4, the dash lower portion 24 is formed to have an outer front wall 48 and an inner front wall 50 which are opposite to each other in the front-back direction, the lower wall 32, an upper wall 52 opposite to the lower wall 32, and a lower wall 53 formed on the inner front wall 50, which will be described later.

The inner front wall 50 has: inner walls 43 as longitudinal walls in which the inner walls 42 that form the left and right locker portions 36, respectively, are extended to the vehicle body front and integrally formed; center side walls 47 as longitudinal walls in which the center side walls 46 configuring the tunnel portion 38 are extended to the vehicle body front and integrally formed; and front groove portions 51 in which the lower groove portions 41 are extended to the vehicle body front and integrally formed.

A rectangular (square) opening 51A is made in the front groove portion 51. Also, rectangular (trapezoidal) openings 50A are made even in both sides in the vehicle width direction of the inner front wall 50. And, since the two front groove portions 51 of the inner front wall 50 are joined to the outer front wall 48, three closed cross-section shapes are put in order in the vehicle width direction, in the dash lower portion 24.

Figure 7:
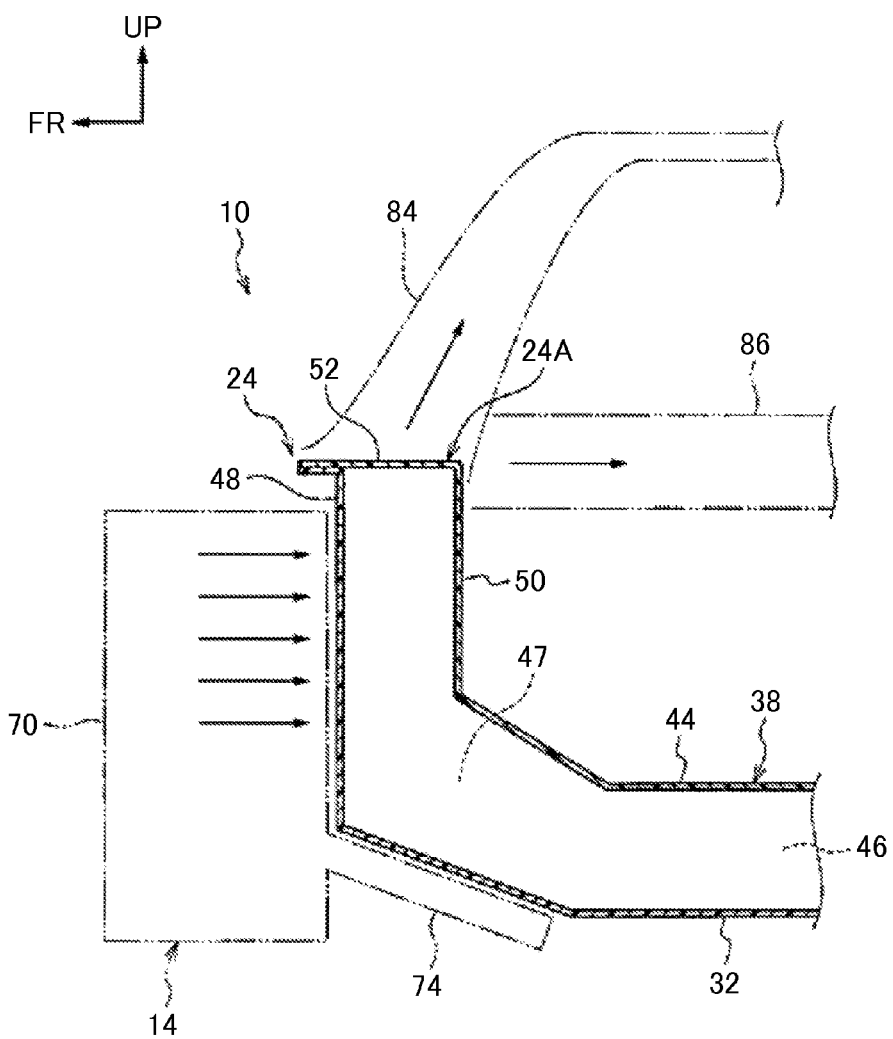
FIG. 7 is a cross-sectional view taken along an X-X line in FIG. 6, which shows a front suspension member, a front pillar and a door belt line while including a positional relation between them and the floor portion.

In short, this dash lower portion 24 is designed so that with the lower wall 32, the outer front wall 48, the inner front wall 50, the upper wall 52, the respective inner walls 43 and the respective center side walls 47, the three closed cross-section shapes are formed in the vehicle width direction. And, as shown in FIG. 6 to FIG. 8, at an upper end 24A of the dash lower portion 24, a closed cross-section shape which extends in the vehicle width direction while including both of the left and right ends (the front walls 28) is further formed.

Figure 8:
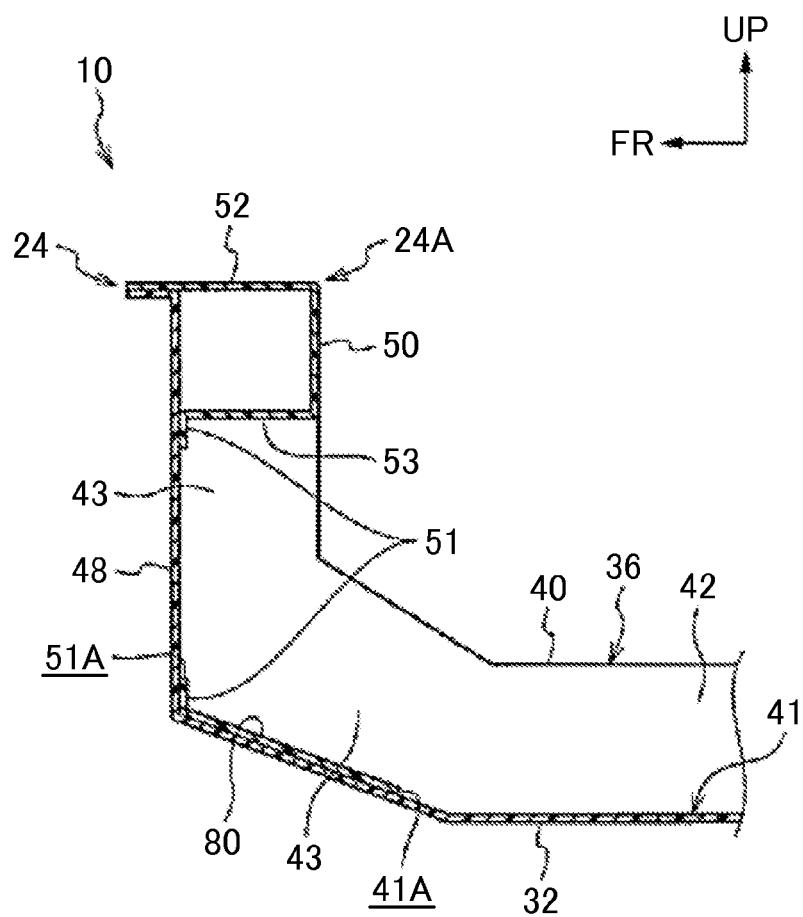
FIG. 8 is a cross-sectional view taken along a Y-Y line in FIG. 6.

That is, at the upper end 24A of the dash lower portion 24 on the vehicle body upside of the opening 51A (the front groove portion 51), as shown in FIG. 8, in a side cross-sectional view viewed from the vehicle width direction, the upper wall 52, the inner front wall 50, the lower wall 53 that extends to the vehicle body front from the lower end of the inner front wall 50 and is opposite to the upper wall 52, and the outer front wall 48 form a closed cross-section structure of rectangular frame shape.

By the way, the vehicle body front end of the lower wall 53 is linked to the front groove portion 51. And, the upper end 24A of the dash lower portion 24 on the vehicle body upside of the opening 50A is similarly designed so that with in a cross-sectional view, a closed cross-section shape of rectangular frame is formed by the upper wall 52, the inner front wall 50, the lower wall 53 and the outer front wall 48.

Also, a part of the lower wall 53 is formed on a portion which is located on the outside of the vehicle width direction of the lower groove portion 41 and is extended to the vehicle body front of the inside in the vehicle width direction of the locker portion 36. Then, a closed cross-section shape on the vehicle body upside of the opening 51A and a closed cross-section shape of the vehicle body upside of the opening 50A are linked through a closed cross-section shape formed in its extension portion (both of the left and right sides of the dash lower portion 24). And, the closed cross-section shape at its upper end 24A is formed up to a position (which includes the front walls 28) that arrives at the front walls 28 which are both of the left and right ends of the floor portion 22.

Consequently, a closed cross-section shape that extends in the vehicle width direction (and that intersects a longitudinal direction of the lower groove portion 41) is formed to be formed at the upper end 24A of the dash lower portion 24 except the extension portion to the vehicle body front of the tunnel portion 38.

By the way, the closed cross-section shape at this upper end 24A can be also regarded to be formed over the vehicle width direction (and continuous between the front walls 28 as both of the left and right ends), through the closed cross-section shape formed in the extension portion (a central portion of the dash lower portion 24) to the vehicle body front of the tunnel portion 38.

Here, the front wall 28 (the closed cross-section shape) is joined to a front pillar (an A pillar) 84 as a vehicle body framework member, as shown in FIG. 7. And, the closed cross-section shape at the upper end 24A is formed at a position at which the closed cross-section shape overlaps with (laps over) a door belt line 86 in the upper-lower direction of the vehicle body, in a side view viewed from the vehicle width direction.

Thus, a load transmission route is formed from the dash lower portion 24 through the closed cross-section shape at its upper end 24A to the front pillar 84 and the door belt line 86. By the way, the door belt line 86 is formed as a closed cross-section shape, in a cross-sectional view viewed from the front-back direction of the vehicle body.

Figure 9:
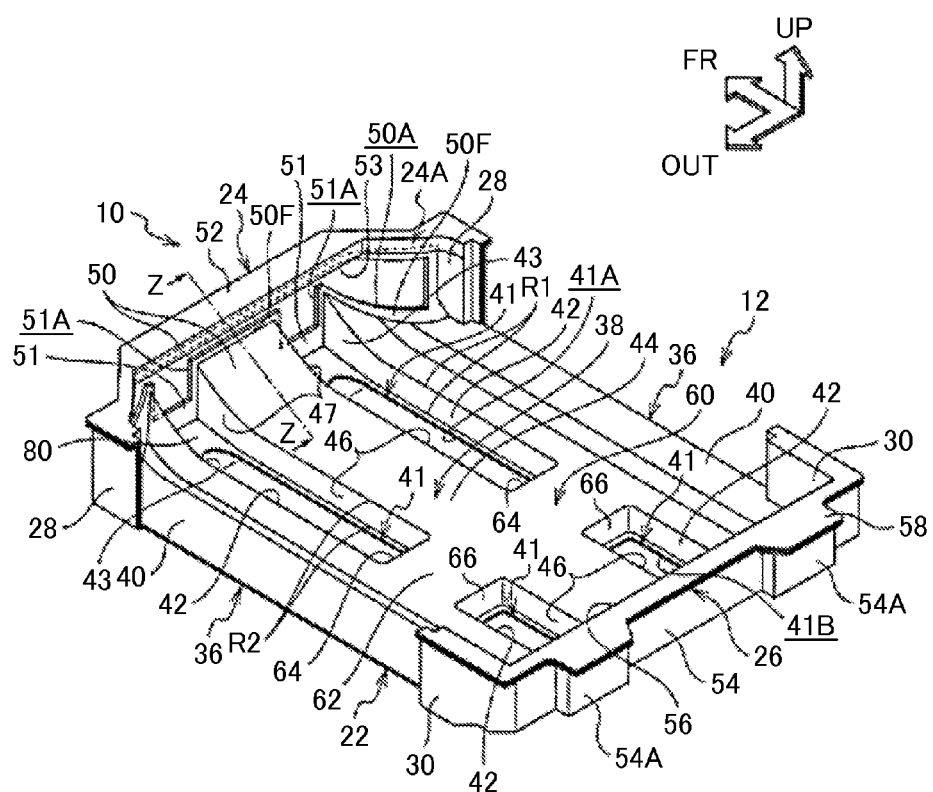
FIG. 9 is a perspective view showing a variation example in the floor portion in which closed cross-section shapes are formed continuously between both of left and right ends, when they are viewed from behind the vehicle body.
Figure 10:
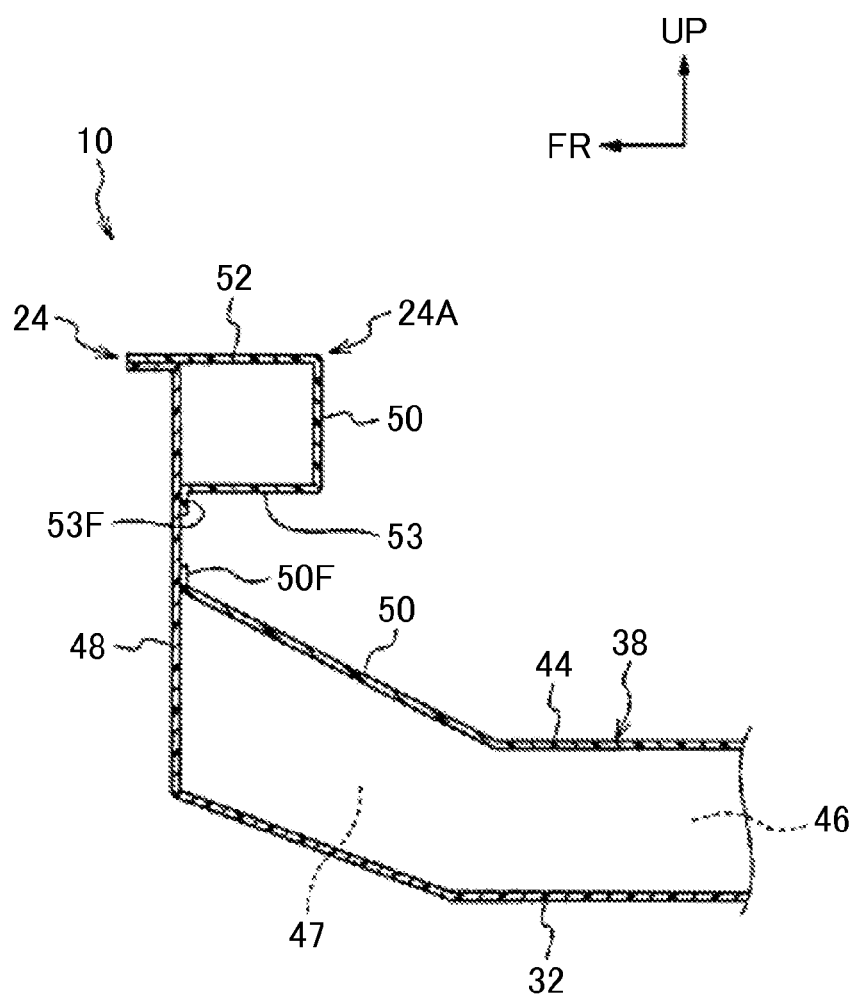
FIG. 10 is a cross-sectional view taken on a Z-Z line in FIG. 9.

Also, the closed cross-section shape formed at the upper end 24A of the dash lower portion 24 (and formed by the outer front wall 48, the inner front wall 50, the upper wall 52 and the lower wall 53) may be formed over the vehicle width direction (and continuous from one end side in the vehicle width direction to the other end side) without any interposition of the three closed cross-section shapes at the dash lower portion 24, as shown in FIG. 9 and FIG. 10.

That is, each of an extension portion to the vehicle body front of the tunnel portion 38 and an extension portion to the vehicle body front, which is located on the outside of the vehicle width direction of the lower groove portion 41 and on the inside of the vehicle width direction of the locker portion 36 is cut away, and the opening 51A and the opening 50A are linked to each other in the vehicle width direction, and the lower wall 53 opposite to the upper wall 52 may be formed over the vehicle width direction (and continuous between the front walls 28 as both of the left and right portions).

According to this, the load inputted to the dash lower portion 24 can be more efficiently transmitted through the closed cross-section shape at its upper end 24A to the left and right front pillars 84 and the door belt lines 86.

By the way, in this configuration, a flange 53F bent toward a vehicle body downside is formed at a vehicle body front end of the lower wall 53. and its flange 53F is joined to the outer front wall 48. Also, a flange 50F that is connected to the front groove portion 51 in the vehicle width direction is formed on the inner front walls 50 of the vehicle body front ends of the tunnel portion 38 and the locker portions 36, and its flange 50F is joined to the outer front wall 48.

Also, the lower portion connected to the upper walls 40 and 44 of the inner front wall 50 is referred to as a slant wall 50S (refer to FIG. 1). The slant wall 50S is slanted with respect to the front-back (horizontal) direction so that its back end side is located lower than its front end side. Then, its front upper end is connected to a lower end of an upper-lower wall 50V (refer to FIG. 1) that is substantially located along the upper-lower direction of the inner front wall 50. And, a back lower end of the slant wall 50S is connected to a front end of the upper wall 40 or 44.

On the other hand, as shown in FIG. 3 and FIG. 5, the lower back portion 26 is formed to have an outer back wall 54 and an inner back wall 56 that are opposite to each other in its front-back direction, the lower wall 32, an upper wall 58 opposite to the lower wall 32, and a lower wall 59 which is formed on the inner back wall 56 and will be described later.

The inner back wall 56 has: inner walls 45 as longitudinal walls in which inner walls 42 that form the left and right locker portions 36, respectively, are extended to the vehicle body backside and integrally formed; center side walls 49 as longitudinal walls in which the center side walls 46 that form the tunnel portion 38 are extended to the vehicle body backside and integrally formed; and back groove portions 57 in which the lower groove portions 41 are extended to the vehicle body backside and integrally formed.

A rectangular (oblong) opening 57A is made in the back groove portion 57 (refer to FIG. 2). And, since the two back groove portions 57 of the inner back wall 56 are joined to the outer back wall 54 and a protrusion wall 54A that is integrated with the outer back wall 54 so as to protrude to the vehicle body backside, the three closed cross-section shapes are put in order in the vehicle width direction in the lower back portion 26.

In short, in this lower back portion 26, the three closed cross-section shapes are formed by the lower wall 32, the outer back wall 54, the inner back wall 56, the upper wall 58, the respective inner walls 45 and the respective center side walls 49, in the vehicle width direction. And, similarly to the dash lower portion 24, a closed cross-section shape that extends in the vehicle width direction while including both of left and right ends (the back walls 30) is further formed at an upper end 26A of the lower back portion 26.

That is, in the upper end 26A of the lower back portion 26 on the vehicle body upside of the opening 57A (the back groove portion 57), in a side cross-sectional view viewed from the vehicle width direction, the upper wall 58, the inner back wall 56, a lower wall 59 that extends to the vehicle body backside from the lower end of the inner back wall 56 and is opposite to the upper wall 58, and the outer back wall 54 form a closed cross-section shape of rectangular frame shape. And, the vehicle body backside end of the lower wall 59 is linked to the back groove portion 57.

Consequently, a closed cross-section shape that extends in the vehicle width direction (and intersects the longitudinal direction of the lower groove portion 41) is formed at the upper end 26A of the lower back portion 26, except the extension portion to the vehicle body backside of the tunnel portion 38 and the extension portion to the vehicle body backside of the locker portion 36.

By the way, the closed cross-section shape at this upper end 26A can also be regarded to be formed over the vehicle width direction (which includes the back walls 30 as both of the left and right ends and is continuous between its back wall 30) through the closed cross-section shape formed in the extension portion (the center of the lower back portion 26) to the vehicle body backside of the tunnel portion 38 and the closed cross-section shape formed in the extension portion (both of the left and right sides of the lower back portion 26) to the vehicle body backside of the locker portion 36.

Here, the back wall 30 (of the closed cross-section shape) is joined to a rear pillar (a C pillar: its illustration is omitted) as the vehicle body framework member. Thus, a load transmission route is formed from the lower back portion 26 through the closed cross-section shape at its upper end 26A to the rear pillar.

By the way, similarly to the dash lower portion 24, in such a way that the closed cross-section shape which is formed at the upper end 26A of the lower back portion 26 (and formed by the outer back wall 54, the inner back wall 56, the upper wall 58 and the lower wall 59) is arranged at a position where the closed cross-section shape overlaps with (laps over) the door belt line 86 in the vehicle body upper-lower direction, in a side cross-sectional view viewed from the vehicle width direction, a height of its lower back portion 26 may be made high.

Also, similarly to the dash lower portion 24 (as shown in FIG. 9 and FIG. 10), the closed cross-section shape formed at the upper end 26A of the lower back portion 26 may be formed over the vehicle width direction (continuous from one end side of the vehicle width direction to the other end side).

That is, it may be formed so that the extension portion to the vehicle body backside of the tunnel portion 38 is cut away and the opening 57A is linked in the vehicle width direction, and even the extension portion to the vehicle body backside of the locker portion 36 is cut away and the opening 57A is extended to the outside in the vehicle width direction, and the lower wall 59 opposite to the upper wall 58 is formed over the vehicle width direction (continuous between the back walls 30 as both of the left and right ends).

According to this, similarly to the dash lower portion 24, the load inputted to the lower back portion 26 can be more efficiently transmitted to the left and right rear pillars (and the door belt line 86) through the closed cross-section shape at its upper end 26A.

Also, a lower portion connected to the upper walls 40 and 44 of the inner back wall 56 is referred to as a slant wall 56S (refer to FIG. 1). The slant wall 56S is slanted with respect to the front-back (horizontal) direction so that its front end side is located lower than its back end side, and its back upper end is connected to the lower end of an upper-lower wall 56V (refer to FIG. 1) that is substantially along the upper-lower direction of the inner back wall 56. And, the front lower end of the slant wall 56S is connected to the back end of the upper wall 40 or upper wall 44.

Also, as shown in FIG. 1 to FIG. 5, the floor portion 22 has the center cross portion 60 (and extends in the vehicle width direction) through which the left and right locker portions 36 and the tunnel portion 38 are bridged at the substantial center in the vehicle body front-back direction. The center cross portion 60 is formed as the closed cross-section structure of rectangular frame shape, in a side cross-sectional view, by the lower wall 32, an upper wall 62 as a cross wall which is opposite to the lower wall 32 in the upper-lower direction, and a front wall 64 and a back wall 66 which are opposite to each other in the front-back direction.

The under body 12 as explained above is made of resin material. As the resin material of which the under body 12 is made, for example, fiber-reinforced resin that contains reinforced fiber such as carbon fiber, glass fiber, aramid fiber and the like is listed.

And, this under body 12 (the floor portion 22) is formed so that as shown in FIG. 2 to FIG. 5, the lower panel 12L and the upper panel 12U are overlapped with each other in the upper-lower direction and joined with adhesive.

In detail, the lower panel 12L is formed to include the lower wall 32, the outer wall 34, the outer front wall 48 of the dash lower portion 24, the outer back wall 54 of the lower back portion 26, outer walls 28A of the front walls 28, outer walls 30A of the back walls 30, and lower flanges 12LF that are thrown outwardly from a circumferential edge in a plain view.

The upper panel 12U is formed to include: the upper wall 40 and the inner wall 42 of the locker portion 36; the upper wall 44 and the center side wall 46 of the tunnel portion 38; the inner front wall 50, the upper wall 52, the lower wall 53, the inner walls 43 and the center side walls 47 of the dash lower portion 24; the inner back wall 56, the upper wall 58, the lower wall 59, the inner wall 45 and the center side wall 49 of the lower back portion 26, the upper wall 62, the front wall 64 and the back wall 66 of the center cross portion 60, inner walls 28B of the front walls 28, inner walls 30B of the back walls 30, and the upper flange 12UF that is thrown outwardly from a circumferential edge in a plain view.

And moreover, this upper panel 12U is formed to include the lower groove portions 41 (the joint portions 80 and 82) formed between the tunnel portion 38 and the locker portions 36, the front groove portion 51 formed on the inner front wall 50, and the back groove portion 57 formed on the inner back wall 56. By the way, as mentioned above, the upper flanges 12UF may be also formed in parts of the lower groove portions 41 around the openings 41A and 41B except the joint portions 80 and 82.

Thus, in the under body 12, the lower panel 12L and the upper panel 12U are adhered to each other because the lower flange 12LF and the upper flange 12UF are joined to each other, the lower wall 32 and the upper flange 12UF are joined to each other, the lower wall 32 and the joint portions 80 and 82 are joined to each other, the outer front wall 48 and the front groove portion 51 are joined to each other, and the outer back wall 54 and the back groove portion 57 are joined to each other, respectively, and the above respective closed cross-section structures are formed. By the way, in the front wall 28, the closed cross-section structure is formed by the outer wall 28A and the inner wall 28B, and in the back wall 30, the closed cross-section structure is formed by the outer wall 30A and the inner wall 30B.

(Configuration of Suspension Module)

As shown in FIG. 1, the front suspension module 14 is formed to at least include a front suspension member 70 and a pair of left and right front suspensions that are not shown. In the front suspension member 70, the vehicle width direction is defined as the longitudinal direction, and it is defined as a closed cross-section structure in a side cross-sectional view in FIG. 1.

Also, in the front suspension member 70, the left and right front suspensions are assembled as a whole. Then, the front suspension member 70 steerably supports front wheels Wf through the respective front suspensions. That is, the respective front suspensions are supported by the front suspension member 70 so as to independently carry out a function without any dependence on the other portions that form the vehicle body of the automobile V.

On the other hand, the rear suspension module 18 is formed to at least include a rear suspension member 72 and a pair of left and right rear suspensions that are not shown. In the rear suspension member 72, the left and right rear suspensions are assembled as a whole. Then, the rear suspension member 72 rotatably supports rear wheels Wr through the respective rear suspensions. That is, the respective rear suspensions are supported by the rear suspension member 72 so as to independently carry out a function without any dependence on the other portions that form the vehicle body of the automobile V.

Moreover, a wheel-in motor that is not shown is built in the rear wheel Wr. And, a battery, which is not shown, for driving the wheel-in motor and a PCU (Power Control Unit) serving as a control device are assembled in the rear suspension module 18. Thus, the rear suspension module 18 can be also regarded as a driving unit of the automobile V.

And, the front suspension member 70 is fixed to the car body front of the dash lower portion 24 because its back wall 78 is fastened to an outer front wall 48, and its flange 74 is fastened to the joint portion 80 (the lower wall 32). Also, the rear suspension member 72 is fixed to the vehicle body backside of the lower back portion 26 because its attachment plate 68 is fastened to a protrusion wall 54A of the outer back wall 54, and its flange 76 is fastened to the joint portion 82 (the lower wall 32).

(Configuration of EA Member)

As shown in FIG. 1, the front EA member 16 is formed as a box shape (substantially rectangular box shape) that has a length along the vehicle width direction which is approximately equal to a length (an interval between the left and right front suspensions) of the vehicle width direction of the front suspension member 70. And, this front EA member 16 is fastened and fixed to the front suspension member 70 in a flange 16F that is thrown from its back end.

On the other hand, the rear EA member 20 is formed as a box shape (substantially rectangular box shape) that has a length along the vehicle width direction which is approximately equal to a length (an interval between the left and right rear suspensions) of the vehicle width direction of the rear suspension member 72. And, this rear EA member 20 is fastened and fixed to the rear suspension member 72 in a flange 20F that is thrown from both ends of its vehicle width direction.

In the front EA member 16 and the rear EA member 20 as mentioned above, the respective portions are integrally made of resin material. As the resin material of which the front EA member 16 or the rear EA member 20 is made, for example, the fiber-reinforced resin that contains the reinforced fiber, such as the carbon fiber, the glass fiber, the aramid fiber and the like, is listed. Also, the front EA member 16 or the rear EA member 20 may be made of metal material such as aluminum and its alloy and the like.

(Action)

With regard to the resin body structure 10 having the foregoing configuration, its action will be described below.

The (electric) automobile V to which the resin body structure 10 according to this embodiment is applied is run by the driving force of the wheel-in motor because an electric power is supplied from the PCU built in the rear suspension member 72 to the wheel-in motor of the rear wheel Wr. And, in this automobile V, the front wheel Wf supported through the front suspension is steered in response to the steering of a steering wheel that is not shown.

In this automobile V, when a front collision is generated, a collision load is inputted to the front EA member 16. This collision load causes the front EA member 16 to be compressed and deformed. Consequently, the front EA member 16, while absorbing an impact energy (a dynamic load), transmits a load (a support reaction force) to the front suspension member 70.

At this time, the collision load inputted to the front EA member 16 is received by the wide surface (the wall long in the vehicle width direction) of the front suspension member 70, and the front EA member 16 is stably compressed and deformed. Thus, the absorption of the collision load by the front EA member 16 is efficiently executed.

And, the collision load, which is transmitted to the front suspension member 70 because the collision load is not completely absorbed by the front EA member 16, is transmitted through the dash lower portion 24 to the floor portion 22, and then absorbed by the floor portion 22.

In detail, the load, which is inputted from the front EA member 16 through the back wall 78 of the front suspension member 70 to the dash lower portion 24, is received by the three closed cross-section structures fainted in the dash lower portion 24, namely, the respective inner walls 43 of the inner front wall 50 and the respective center side walls 47 which form the respective closed cross-section structures, respectively.

For this reason, it is possible to suppress a bent deformation to the vehicle body backside of the outer front wall 48. Also, the load can be transmitted from the respective inner walls 43 of the inner front wall 50 and the respective center side walls 47 to ridge lines R1 (refer to FIG. 4) on the respective inner walls 42 on the front of the locker portion 36 and ridge lines R2 (refer to FIG. 4) on the respective center side walls 46 on the front of the tunnel portion 38.

In short, the three closed cross-section structures (the closed cross-section shapes) formed in the dash lower portion 24 are formed while being connected to the locker portions 36 and the tunnel portion 38 of the floor portion 22, respectively. Thus, the load inputted to the dash lower portion 24 is efficiently transmitted from the dash lower portion 24 to the locker portions 36 and the tunnel portion 38 of the floor portion 22 and absorbed thereby.

Also, the closed cross-section shape that extends in the vehicle width direction while including both of the left and right ends (the front walls 28) is formed at the upper end 24A of the dash lower portion 24. And, its closed cross-section shape is connected to the front pillars 84 and the door belt line 86 so that the load can be transmitted to the front pillars 84 and the door belt line 86 (the front walls 28 are joined to the front pillars 84, and the upper end 24A overlaps with the door belt line 86 in the upper-lower direction).

Thus, the load that is inputted (transmitted) to the dash lower portion 24 is efficiently transmitted through the closed cross-section shape, which is formed in its upper end 24A, even to the front pillars 84 and the door belt line 86 and also absorbed by the front pillars 84 and the door belt line 86. Hence, the deformation in the floor portion 22 can be suppressed more efficiently.

By the way, as shown in FIG. 9 and FIG. 10, in a case that the closed cross-section shape formed in the upper end 24A of the dash lower portion 24 is formed continuously between both of the left and right ends (the front walls 28), the load can be furthermore efficiently transmitted to the front pillars 84 and the door belt line 86.

Also, in this automobile V, when a rear surface collision is generated, a collision load is inputted to the rear EA member 20. This collision load causes the rear EA member 20 to be compressed and deformed. Consequently, the rear EA member 20, while absorbing an impact energy (a dynamic load), transmits a load (a support reaction force) to the rear suspension member 72.

At this time, the collision load inputted to the rear EA member 20 is received by the wide surface (the wall long in the vehicle width direction) of the rear suspension member 72, and the rear EA member 20 is stably compressed and deformed. Thus, the absorption of the collision load by the rear EA member 20 is efficiently executed.

And, the collision load, which is transmitted to the rear suspension member 72 because the collision load is not completely absorbed by the rear EA member 20, is transmitted through the lower back portion 26 to the floor portion 22, and then absorbed by the floor portion 22.

In detail, the load, which is inputted from the rear EA member 20 through the attachment plate 68 of the rear suspension member 72 to the lower back portion 26, is received by the three closed cross-section structures formed in the lower back portion 26, namely, the respective inner walls 45 of the inner back wall 56 and the respective center side walls 49 which form the respective closed cross-section structures, respectively.

For this reason, it is possible to suppress a bent deformation to the vehicle body front of the outer back wall 54. Also, the load can be transmitted from the respective inner walls 45 of the inner back wall 56 and the respective center side walls 49 to ridge lines R3 (refer to FIG. 5) on the respective inner walls 42 on the backside of the locker portion 36 and ridge lines R4 (refer to FIG. 5) on the respective center side walls 46 on the backside of the tunnel portion 38.

In short, the three closed cross-section structures (the closed cross-section shapes) formed in the lower back portion 26 are formed while being connected to the locker portions 36 and the tunnel portion 38 of the floor portion 22, respectively. Thus, the load inputted to the lower back portion 26 is efficiently transmitted from the lower back portion 26 to the locker portions 36 and the tunnel portion 38 of the floor portion 22 and absorbed thereby.

Also, the closed cross-section shape that extends in the vehicle width direction while including both of the left and right ends (the back walls 30) is formed at the upper end 26A of the lower back portion 26. And, its closed cross-section shape is connected to the rear pillars so that the load can be transmitted to the rear pillars (the back walls 30 are joined to the rear pillar).

Thus, the load that is inputted (transmitted) to the lower back portion 26 is efficiently transmitted through the closed cross-section shape, which is formed in its upper end 26A, even to the rear pillars and also absorbed by its rear pillars. Hence, the deformation in the lower back portion 26 can be suppressed more efficiently.

By the way, as mentioned above, in a case that the closed cross-section shape formed in the upper end 26A of the lower back portion 26 overlaps with the door belt line 86 in the upper-lower direction, the load can be efficiently transmitted to even its door belt line 86.

Also, as mentioned above, in a case that the closed cross-section shape formed in the upper end 26A of the lower back portion 26 is formed continuously between both of the left and right ends (the back walls 30), the load can be furthermore efficiently transmitted to the rear pillars (and the door belt line 86).

Also, in this automobile V, even when a side collision is formed, a collision load inputted by The side collision is received (absorbed) in the center cross portion 60 formed in the closed cross-section structure in the floor portion 22. In short, the load inputted from the vehicle body side (the outside in the vehicle width direction) is efficiently transmitted to the center cross portion 60 and absorbed thereby. Thus, it is possible to suppress the deformation in the floor portion 22.

(Configuration of Under Body According to Second Embodiment)

Next, the second embodiment will be described below. By the way, the same symbol is assigned to a portion similar to the first embodiment, and its detailed explanation (that includes an action) is omitted.

Figure 11:
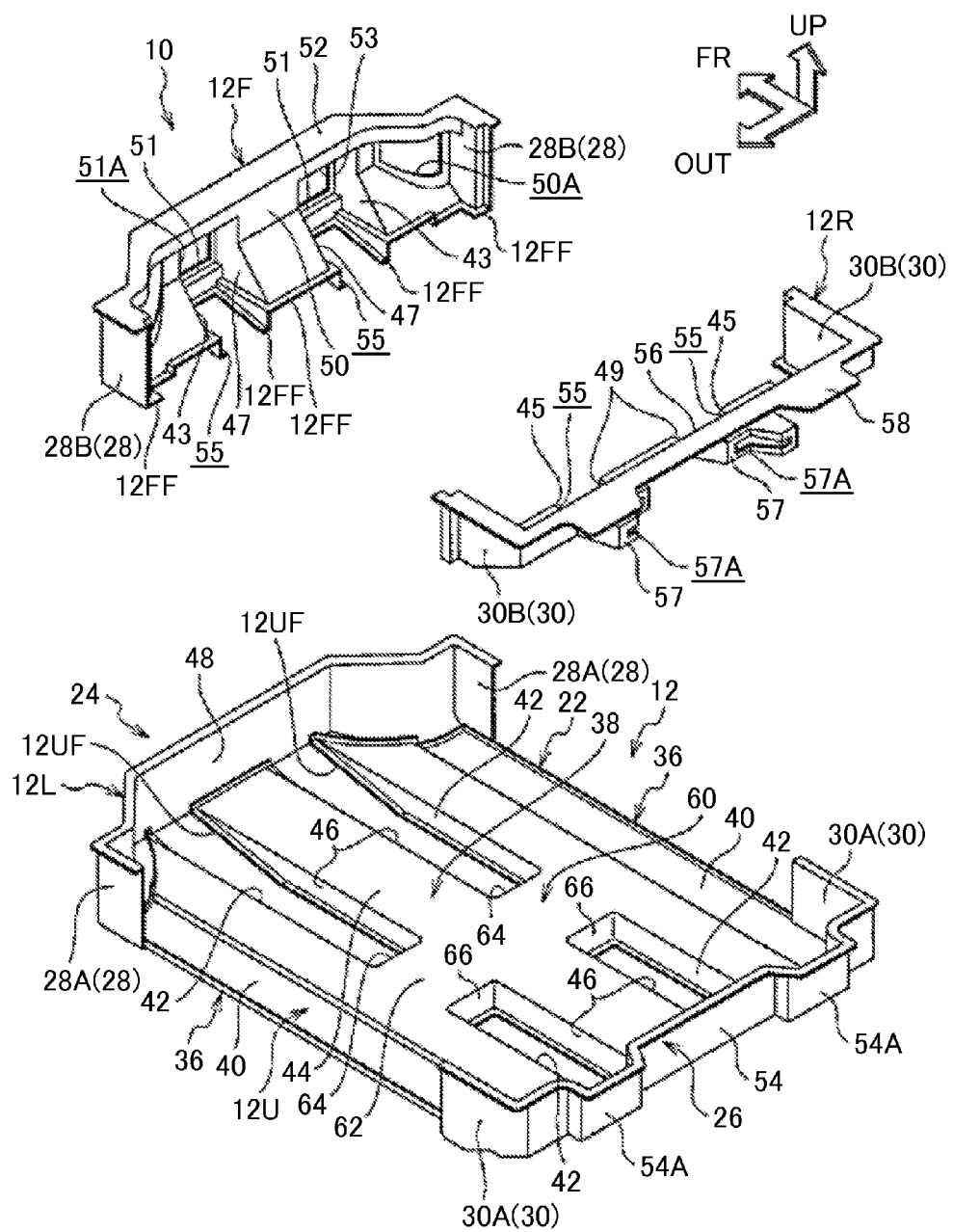
FIG. 11 is an exploded perspective view showing an upper panel, a lower panel, a front panel and a rear panel, which form a floor portion of a resin body structure according to a second embodiment, when they are viewed from behind the vehicle body.

As shown in FIG. 11, an under body 12 made of resin according to the second embodiment is formed by a lower panel 12L, an upper panel 12U, a front panel 12F and a rear panel 12R. That is, the front panel 12F and the rear panel 12R are joined to the lower panel 12L and the upper panel 12U that are joined to each other. Consequently, the floor portion 22 that has a substantially rectangular shape in a plain view is formed.

The lower panel 12L according to the second embodiment is equal to that of the first embodiment. And, the upper panel 12U according to the second embodiment has a shape which differs from that of the first embodiment. In detail, this upper panel 12U is formed to have the upper walls 40 and 44, the inner walls 42, the center side walls 46, the front walls 64, the back walls 66 and the upper flanges 12UF, except the wall portion which forms the dash lower portion 24 and the lower back portion 26. Then, those vehicle body front end and vehicle body back end are extended so as to arrive at the outer front wall 48 and the outer back wall 54, respectively.

On the other hand, the front panel 12F has the inner wall 28B (the front wall 28) and the wall portion that forms the dash lower portion 24, namely, the inner front wall 50, the upper wall 52, the lower wall 53, the inner walls 43, the center side walls 47 and the front groove portions 51, and the opening 51A is made in each of the front groove portions 51. Then, the openings 50A are made in both of the left and right sides of the inner front wall 50. By the way, the vehicle body backside of each of the front groove portions 51, namely, a portion between the center side wall 47 and the inner wall 43 is cut out to a rectangular shape, and flanges 12FF are formed in the circumferential edge of its cutout 55 and the circumferential edge of the lower end of the inner front wall 50.

Also, the rear panel 12R has the inner walls 30B (the back walls 30), and the wall portion that forms the lower back portion 26, namely, the inner back wall 56, the upper wall 58, the lower wall 59 (refer to FIG. 3 and FIG. 5), the inner walls 45, the center side walls 49 and the back groove portions 57. Then, the opening 57A is made in each of the back groove portions 57. By the way, the vehicle body front of each of the back groove portions 57, namely, a portion between the center side wall 49 and the inner wall 45 is cut away. Then, flanges (whose illustrations are omitted) are formed in the circumferential edge of its cutout 55 and the circumferential edge of the lower end of the inner back wall 56.

Figure 12:
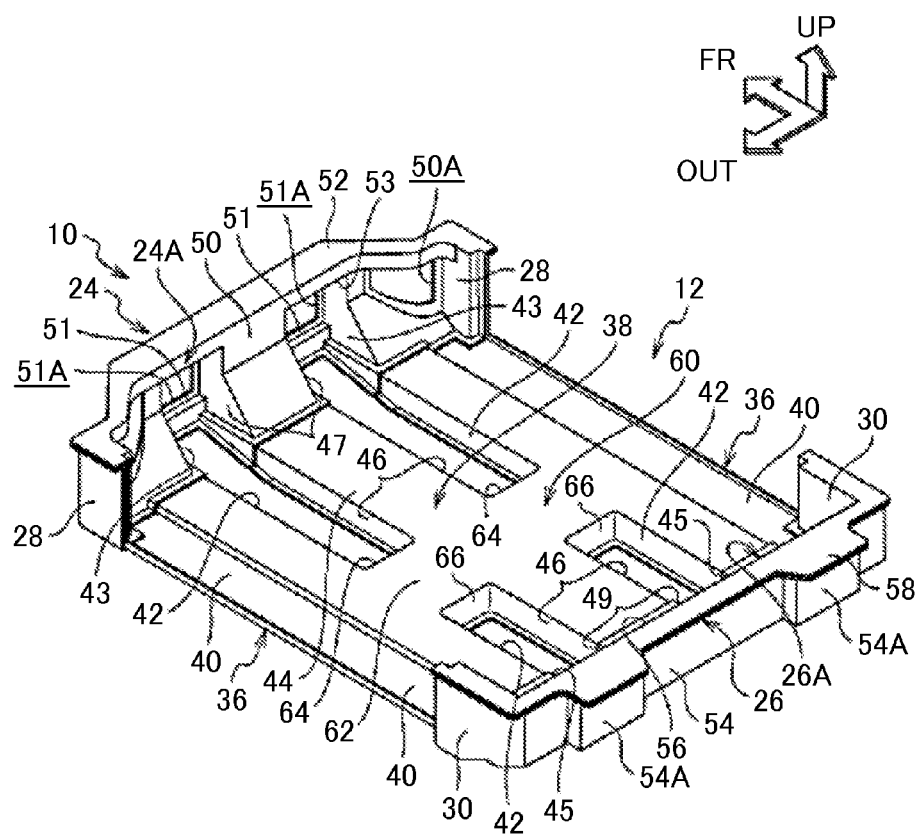
FIG. 12 is a perspective view showing the floor portion of the resin body structure according to the second embodiment when it is viewed from behind the vehicle body.

Thus, as shown in FIG. 11 and FIG. 12, after the lower panel 12L and the upper panel 12U are joined to each other, the flanges 12FF of the front panel 12F are joined to the upper flanges 12UF and the upper walls 40 and 44 of the upper panel 12U from above, and the front groove portions 51 of the front panel 12F are joined to the outer front wall 48. Consequently, its front panel 12F is fixed to the lower panel 12L and the upper panel 12U.

Similarly, after the lower panel 12L and the upper panel 12U are joined to each other, the flanges (whose illustrations are omitted) of the rear panel 12R are joined to the upper flanges 12UF and the upper walls 40 and 44 of the upper panel 12U from above, and the back groove portions 57 of the rear panel 12R are joined to the outer back wall 54. Consequently, its rear panel 12R is fixed to the lower panel 12L and the upper panel 12U.

The floor portion 22 (the under body 12) according to the second embodiment as configured above becomes equal to that of the first embodiment. That is, even in the floor portion 22 (the under body 12) according to the second embodiment, similarly to the first embodiment, the closed cross-section shapes that include both of the left and right ends (the front walls 28 and the back walls 30) and extend in the vehicle width direction are formed at the upper end 24A of the dash lower portion 24 and the upper end 26A of the lower back portion 26 (it includes a case that the closed cross-section shape is formed continuously between both of the left and right ends).

Also, in the floor portion 22 according to this second embodiment, the upper panel 12U according to the first embodiment is shaped to be divided into three components. Thus, a mold used in this second embodiment has a merit that its structure can be made simple, as compared with a mold for molding the upper panel 12U according to the first embodiment. In short, the dash lower portion 24 and the lower back portion 26 can be molded independently of each other. Thus, even if the shapes of the dash lower portion 24 and the lower back portion 26 are complicated, it is possible to easily correspond to the complicated shapes.

As explained above, according to the resin body structure 10 of this embodiment, the load inputted to the dash lower portion 24 at the time of the front collision can be efficiently transmitted to the front pillars 84 and the door belt line 86 (the upper body) which serve as the vehicle body framework members. And, the load inputted to the lower back portion 26 at the time of the back collision can be efficiently transmitted to the rear pillar (and the door belt line 86) (the upper body) which serves as the vehicle body framework member.

In short, according to the resin body structure 10 of this embodiment, the collision load generated at the time of the front collision or back collision can be efficiently transmitted not only to the floor portion 22 but also to the front pillar 84 and the rear pillar and further to the door belt line 86. Thus, the load absorbed by (burdened on) the floor portion 22 can be reduced, thereby enabling the deformation in a vehicle chamber (the floor portion 22) to be more effectively suppressed.

Also, even if the under body 12 is made of resin, the dash lower portion 24 and the lower back portion 26 each of which has the three closed cross-section structures can be made function as energy absorption materials at the time of the collision. Thus, as compared with a configuration to which a different energy absorption material is added, the cost and weight of the automobile V can be reduced.

In particular, the openings 41A, 41B, 50A, 51A and 57A are made in the upper panel 12U according to the first embodiment, respectively, and the openings 41A, 41B, 50A and 51A are made in the front panel 12F according to the second embodiment, respectively. Also, the opening 57A is made in the rear panel 12R. Thus, the weight can be further reduced.

As mentioned above, the vehicle body structure (the resin body structure 10) according to this embodiment has been explained on the basis of the drawings. However, the vehicle body structure (the resin body structure 10) according to this embodiment is not limited to the shown structures. Its design can be properly changed in a range without departing from the spirit and scope of the present invention. For example, the upper panel 12U and the lower panel 12L, and further, the front panel 12F and the rear panel 12R may be formed so as to be joined by fusing or welding.

Also, the closed cross-section shapes, which are formed in the dash lower portion 24 and the lower back portion 26 so as to extend in the vehicle width direction, respectively, are not limited to the configurations formed in the respective upper ends 24A and 26A. That is, those closed cross-section shapes may be formed to be formed above the upper portion of the dash lower portion 24 and the upper portion of the lower back portion 26, which are slightly lowered from the upper walls 52 and 58, respectively.

Description of the Reference Numerals and Symbols

10/ RESIN BODY STRUCTURE (VEHICLE BODY STRUCTURE)
12/ UNDER BODY
12U/ UPPER BODY
12L/ LOWER PANEL
12F/ FRONT PANEL
12R/ REAR PANEL
22/ FLOOR PORTION
32/ LOWER WALL
40/ UPPER WALL
44/ UPPER WALL
48/ OUTER FRONT WALL
50/ INNER FRONT WALL
54/ OUTER BACK WALL
56/ INNER BACK WALL
86/ DOOR BELT LINE

The invention claimed is:

1. A vehicle body structure comprising:
a lower panel made of resin that includes a lower wall that forms a lower portion of a floor portion, an outer front wall that is placed to extend from a vehicle body front end of the lower wall to an upper direction of a vehicle body, and an outer back wall that is placed to extend from a vehicle body backside end of the lower wall to the upper direction of the vehicle body; and
an upper panel made of resin that includes an upper wall that forms an upper portion of the floor portion opposite to the lower wall and also forms a closed cross-section shape extending in a front-back direction of the vehicle body, an inner front wall that is placed to extend from the vehicle body front end of the upper wall to the upper direction of the vehicle body and joined to the outer front wall and that forms a closed cross-section shape that is connected to the closed cross-section shape extending in the front-back direction of the vehicle body and extends in a vehicle width direction while including both of left and right ends at the upper portion of the outer front wall, and an inner back wall that is placed to extend from a vehicle body backside end portion of the upper wall to the upper direction of the vehicle body and joined to the outer back wall and that forms a closed cross-section shape that is connected to the closed cross-section shape extending in the front-back direction of the vehicle body and extends in the vehicle width direction while including both of left and right ends at an upper portion of the outer back wall.

2. A vehicle body structure comprising:

a lower panel made of resin that includes a lower wall that forms a lower portion of a floor portion, an outer front wall that is placed to extend from a vehicle body front end of the lower wall to an upper direction of a vehicle body, and an outer back wall that is placed to extend from a vehicle body backside end of the lower wall to the upper direction of the vehicle body;

an upper panel made of resin that includes an upper wall that forms an upper portion of the floor portion opposite to the lower wall and that forms a closed cross-section shape extending in a front-back direction of the vehicle body;

a front panel made of resin that includes an inner front wall that is joined to the vehicle body front end of the upper wall and the outer front wall and that forms a closed cross-section shape that is connected to the closed cross-section shape extending in the front-back direction of the vehicle body and extends in a vehicle width direction while including both of left and right ends at an upper portion of the outer front wall; and a rear panel made of resin that includes an inner back wall that is joined to the vehicle body backside end of the upper wall and the outer back wall and that forms a closed cross-section shape that is connected to the closed cross-section shape extending in the front-back direction of the vehicle body and extends in the vehicle width direction while including both of left and right ends at an upper portion of the outer back wall.

3. The vehicle body structure according to the claim 1, wherein the closed cross-section shape that is configured by at least the outer front wall and the inner front wall is formed at a position at which the closed cross-section shape overlaps with a door belt line in an upper-lower direction of the vehicle body, when they are viewed from the vehicle width direction.

4. The vehicle body structure according to claim 1, wherein the closed cross-section shape that is configured by at least the outer front wall and the inner front wall is formed continuously between both of the left and right ends.

5. The vehicle body structure according to the claim 2, wherein the closed cross-section shape that is configured by at least the outer front wall and the inner front wall is formed at a position at which the closed cross-section shape overlaps with a door belt line in an upper-lower direction of the vehicle body, when they are viewed from the vehicle width direction.

6. The vehicle body structure according to claim 2, wherein the closed cross-section shape that is configured by at least the outer front wall and the inner front wall is formed continuously between both of the left and right ends.

\* \* \* \* \*